(12) United States Patent
Hoshiba

(10) Patent No.: US 9,132,831 B2
(45) Date of Patent: Sep. 15, 2015

(54) CONTROL APPARATUS FOR VEHICLE

(75) Inventor: Takeshi Hoshiba, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/354,240

(22) PCT Filed: Oct. 27, 2011

(86) PCT No.: PCT/JP2011/074858
§ 371 (c)(1),
(2), (4) Date: Apr. 25, 2014

(87) PCT Pub. No.: WO2013/061452
PCT Pub. Date: May 2, 2013

(65) Prior Publication Data
US 2014/0277891 A1 Sep. 18, 2014

(51) Int. Cl.
*B60W 30/188* (2012.01)
*B60W 20/00* (2006.01)
*B60W 30/18* (2012.01)
*B60K 6/445* (2007.10)
*B60W 10/06* (2006.01)
*B60W 10/08* (2006.01)
*F02D 29/02* (2006.01)
*F02D 41/06* (2006.01)
*F02D 11/10* (2006.01)
*F02N 11/08* (2006.01)

(52) U.S. Cl.
CPC ............. *B60W 20/10* (2013.01); *B60K 6/445* (2013.01); *B60W 10/06* (2013.01); *B60W 10/08* (2013.01); *B60W 20/40* (2013.01); *B60W 30/18018* (2013.01); *F02D 11/105* (2013.01); *F02D 29/02* (2013.01); *F02D 41/065* (2013.01); *F02D 2200/602* (2013.01); *F02N 11/0814* (2013.01); *Y02T 10/48* (2013.01); *Y02T 10/6239* (2013.01); *Y02T 10/6286* (2013.01); *Y10S 903/93* (2013.01)

(58) Field of Classification Search
CPC ..... B60W 10/06; B60W 10/08; B60W 20/10; B60W 20/40; B60W 2520/105; B60W 2540/10; B60W 30/18018; F02D 11/105; F02D 11/106; F02D 29/02; F02D 2200/602; F02N 11/0803; F02N 11/0814; F02N 11/0818; F02N 11/0822; F02N 11/0825; F02N 11/0844; F02N 11/0848; F02N 11/0851; F02N 11/0855
See application file for complete search history.

(56) References Cited

U.S. PATENT DOCUMENTS 5,818,116 A 10/1998 Nakae et al.
8,002,058 B2 8/2011 Ishikawa

FOREIGN PATENT DOCUMENTS

| JP | 09-222064 | 8/1997 |
|---|---|---|
| JP | 2003-293915 A | 10/2003 |
| JP | 2003-328811 A | 11/2003 |

(Continued)

Primary Examiner — Jerrah Edwards
(74) Attorney, Agent, or Firm — Kenyon & Kenyon LLP

(57) ABSTRACT

In a vehicle with a driving power source (an engine, a motor generator, or a similar component) to output driving power for running to a driving wheel, in a case where a restart is requested on the driving power source in an accelerator-on state after a stop operation is performed on the driving power source (a hybrid system) during running of a vehicle, the driving power corresponding to an accelerator position at the time of restart request is not directly output. Instead, the driving power is output to the driving wheels while being gradually increased. This reduces deterioration of drivability in recovery of the driving power.

8 Claims, 11 Drawing Sheets

(56) References Cited

FOREIGN PATENT DOCUMENTS

| | | |
|---|---|---|
| JP | 2006-070716 A | 3/2006 |
| JP | 2006-283559 A | 10/2006 |
| JP | 2007-023919 A | 2/2007 |
| JP | 2007-216833 A | 8/2007 |
| JP | 2008-232110 A | 10/2008 |
| JP | 2009-214564 A | 9/2009 |
| JP | 2010-018174 A | 1/2010 |

CONTROL APPARATUS FOR VEHICLE

CROSS-REFERENCE TO RELATED APPLICATIONS

This is a national phase application based on the PCT International Patent Application No. PCT/JP2011/074858 filed on Oct. 27, 2011, the entire contents of which are incorporated herein by reference.

TECHNICAL FIELD

The present invention relates to a control apparatus for a vehicle.

BACKGROUND ART

As a vehicle such as an automobile, a vehicle that employs only an engine such as a gasoline engine and a diesel engine (an internal combustion engine) as a driving power source for running (a conventional vehicle) is generally known. Recently, a hybrid vehicle, an electric vehicle (EV), a fuel cell vehicle, or a similar vehicle has been developed and put to practical use as a vehicle that promotes environment protection.

Among these vehicles, the hybrid vehicle includes an engine and an electric motor (for example, a motor generator or a motor). The electric motor is driven by electric power generated by an output from the engine and electric power stored in a battery (an electric storage device). The use of one of or both of the engine and the electric motor as a source for driving power for running ensures running the hybrid vehicle.

The hybrid vehicle includes a power switch to change between start and stop of a hybrid system (a driving power source). When, for example, the power switch is operated with a brake pedal operated, the hybrid system starts. If the power switch is operated during running of the vehicle, the hybrid system stops.

Note that, in a hybrid vehicle, there is the following technique described in Patent Literature 1 as a technique for starting or stopping a hybrid system. In the technique described in Patent Literature 1, when a vehicle start/stop switch is operated to an engine stop position (Off position or Ready-Off) while the vehicle is running at a high speed, an engine stop is prohibited. By so doing, the amount of discharge of a battery does not exceed an upper limit discharge amount. Thus, the battery is protected.

CITATION LIST

Patent Literatures

[Patent Literature 1] JP 2007-216833A
[Patent Literature 2] JP 2007-023919A

SUMMARY OF INVENTION

Technical Problem

Meanwhile, a driver in the hybrid vehicle may operate a power switch (IG-Off operation) during running of the vehicle. Operating the power switch stops the hybrid system, and a driving power for driving wheels is exhausted. At this time, if the driver operates the power switch while depressing an accelerator pedal (an accelerator-on state), the driving power is suddenly generated (recovered), deteriorating drivability.

The same goes for a conventional vehicle, an electric vehicle, a fuel cell vehicle, or a similar vehicle.

Note that the technique described in Patent Literature 1 is a technique for, when the vehicle start/stop switch is operated to the engine stop position while the vehicle is running at a high speed, forcible engine stop is prohibited and does not take into consideration the case where IG-On operation is performed after a running engine is stopped and, in addition, a recovery of the driving power in restart is also not taken into consideration.

The present invention has been achieved in view of the above circumstances, it is an object of the present invention to provide a control device for a vehicle that is able to reduce deterioration of drivability, which occurs when a driving power source is operated to stop while the vehicle is running, and then the driving power source is restarted.

Solutions to the Problems

The present invention is a control apparatus for a vehicle with a driving power source to output driving power for running to a driving wheel. The control apparatus has a technical feature as follows. In the case where a restart is requested on the driving power source in an accelerator-on state after a stop operation is performed on the driving power source during running of the vehicle and before the vehicle stops running, the control apparatus controls driving power output to the driving wheel to be gradually increased. In a case where the restart is requested on the driving power source in the accelerator-on state after the stop operation is performed on the driving power source during running of the vehicle and an accelerator operation is repeatedly performed between on and off after the restart request, a degree of gradual increase in the driving power output to the driving wheel is increased every time the accelerator-on operation is performed.

The restart request means a request input to a control apparatus for a vehicle by a start operation of a driving power source. The start operation of a driving power source is performed after the stop operation of the driving power source is performed during running of the vehicle and before the vehicle stops running (during freewheeling).

According to the present invention, in the case where the restart is requested on the driving power source in the accelerator-on state after the stop operation is performed on the driving power source during running of a vehicle, the driving power corresponding to an accelerator position at the time of restart request is not directly output. Instead, the driving power is output to the driving wheels while being gradually increased. This reduces deterioration of drivability in recovery of the driving power.

A specific configuration of the present invention can be configured as follows. The control apparatus for a vehicle gradually increases the driving power output to the driving wheel by controlling output driving power from the driving power source based on an accelerator position moderating value. The accelerator position moderating value is a value where a moderating process is performed on an actual accelerator position when the restart is requested on the driving power source in the accelerator-on state after the stop operation is performed on the driving power source during running of the vehicle and before the vehicle stops running.

In this case, in a case where the actual accelerator position when the restart is requested on the driving power source in the accelerator-on state after the stop operation is performed on the driving power source during running of the vehicle and before the vehicle stops running is large, a moderating coefficient for the moderating process may be set large compared with a case where the actual accelerator position is small. This setting ensures more effective reduction of deterioration of drivability when the amount of accelerator operation upon the restart request of the driving power source is large.

In the present invention, instead of the moderating process, another slow change processing such as a rate processing may be employed to gradually increase the output driving power from the driving power source.

This configuration may be configured as follows. In the case where output driving power from the driving power source is controlled based on an accelerator position moderating value where a moderating process is performed on an actual accelerator position when the restart is requested on the driving power source, a moderating coefficient for the moderating process on the actual accelerator position is decreased every time the accelerator-on operation is performed, so as to increase a degree of gradual increase of the driving power output to the driving wheel.

With the configuration, in the case where the stop operation of the driving power source is performed during running of the vehicle and then the accelerator pedal is repeatedly depressed and released at a start of the driving power source according to the restart request of the driving power source, as the number of times of accelerator-on operations increases, a degree of increase of the driving power (driving power output to the driving wheels) can be gradually increased. This allows smoothly increases the driving power even if the accelerator is repeatedly on and off after the restart request of the driving power source, thus reducing deterioration of drivability.

Here, the present invention is applicable to a hybrid vehicle mounting an engine and an electric motor (for example, a motor generator or a motor) as the driving power source for running, a conventional vehicle mounting only an engine as the driving power source for running, an electric vehicle and a fuel cell vehicle mounting only an electric motor as the driving power source for running, and a similar vehicle.

Another configuration of the present invention can be configured as follows. In the control apparatus for a vehicle with a driving power source to output driving power for running to a driving wheel. In a case where the driving power source is restarted by a start operation of the driving power source in an accelerator-on state after a stop operation is performed on the driving power source during running of the vehicle and before the vehicle stops running, the control apparatus controls the driving power output from the driving power source to the driving wheel to be gradually increased. In a case where the start operation of the driving power source is performed in the accelerator-on state after the stop operation is performed on the driving power source during running of the vehicle and an accelerator operation is repeatedly performed between on and off after the start operation, a degree of gradual increase in the driving power output to the driving wheel is increased every time the accelerator-on operation is performed.

With this configuration, in the case where the stop operation of the driving power source is performed during running of the vehicle and then the start operation of the driving power source is performed in the accelerator-on state before the vehicle stops running, the driving power corresponding to the accelerator position at the time of the start operation is not directly output, but the driving power is output to the driving wheels while being gradually increased, thus reducing deterioration of drivability in recovery of the driving power.

Advantageous Effects of Invention

According to the present invention, during running of a vehicle, in the case where the restart is requested on the driving power source in the accelerator-on state after the stop operation is performed on the driving power source during running of a vehicle, the driving power is output to the driving wheels while being gradually increased. This reduces deterioration of drivability in recovery of the driving power.

DESCRIPTION OF EMBODIMENTS

Hereinafter, an embodiment of the present invention will be described with reference to the accompanying drawings.
(Embodiment 1)

Figure 1:
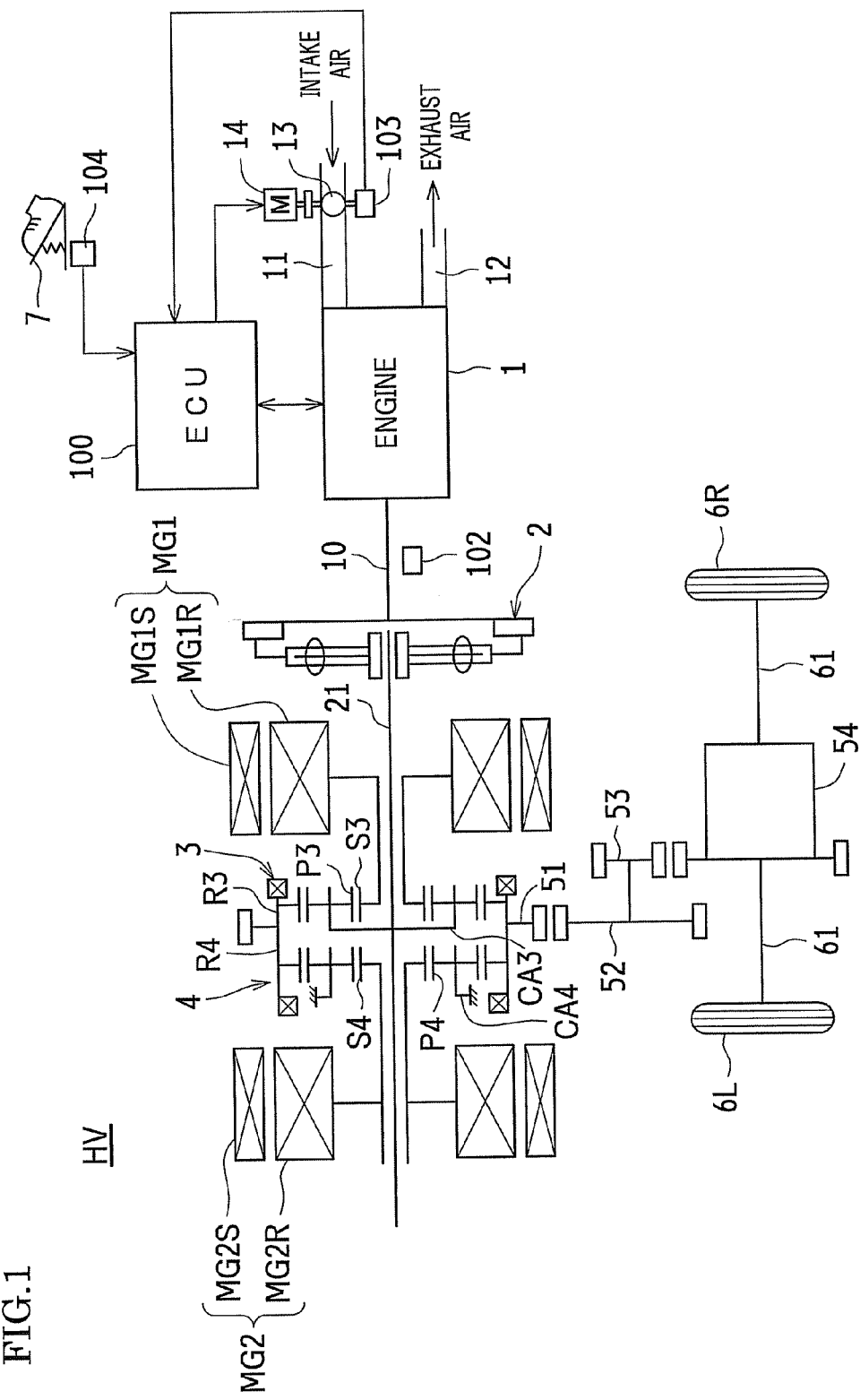
FIG. 1 is a schematic configuration diagram that shows an example of a vehicle to which the present invention is applied.

FIG. 1 is a schematic configuration diagram that shows an example of a vehicle to which the present invention is applied.

The vehicle in this example is a front-engine front-wheel drive (FF) system hybrid vehicle HV, and includes an engine (an internal combustion engine) 1, a first motor generator MG1, a second motor generator MG2, a power split mechanism 3, a reduction mechanism 4, a counter drive gear 51, a counter driven gear 52, a final gear 53, a differential unit 54, front wheel shafts (drive shafts) 61 and 61, front wheels (driving wheels) 6L and 6R, rear wheels (driven wheels, not illustrated), an Electronic Control Unit (ECU) 100, and a similar component. The internal combustion engine 1 generates a driving power for vehicle running. The first motor generator MG1 mainly functions as a generator. The second motor generator MG2 mainly functions as an electric motor. The program executed by the ECU 100 ensures the control apparatus for the hybrid vehicle according to the present invention.

The ECU 100 is, for example, configured with a hybrid (HV) ECU, an engine ECU, a battery ECU, or a similar ECU. These ECUs are communicably coupled to one another.

Next, each unit of the engine 1, the motor generators MG1 and MG2, the power split mechanism 3, the reduction mechanism 4, the ECU 100, and a similar component will be described below.

—Engine—

The engine 1 is a known power unit (an internal combustion engine), which burns fuel to output power, such as a gasoline engine and a diesel engine. Additionally, the engine 1 can control an operating state such as a throttle position (air intake quantity) of a throttle valve 13 disposed in an intake passage 11, a fuel injection quantity, and an ignition timing. Exhaust gas after burning is discharged to the outside air through an exhaust passage 12 after being purified by an oxidation catalyst (not illustrated).

Control of the throttle valve 13 in the engine 1 employs, for example, an electronic throttle control that controls a throttle position to obtain appropriate air intake quantity (target intake quantity) corresponding to a state of the engine 1 such as an engine rotation speed and an accelerator pedal depressing amount (an accelerator position) by the driver. This electronic throttle control uses a throttle position sensor 103 to detect an actual throttle position of the throttle valve 13. A throttle motor 14 of the throttle valve 13 is controlled by a feedback control such that the actual throttle position coincides with a throttle position (a target throttle position) to obtain the target intake quantity.

Output of the engine 1 is transmitted to an input shaft 21 via a crankshaft (an output shaft) 10 and a damper 2. The damper 2 is, for example, a coil spring-type transaxle damper, and absorbs torque variation of the engine 1.

—Motor Generator—

The first motor generator MG1 is an alternating-current synchronous generator that includes a rotor MG1R and a stator MG1S. The rotor MG1R is formed of a permanent magnet and is relatively and rotatably supported by the input shaft 21. Three-phase coils are wound on the stator MG1S. The first motor generator MG1 not only functions as a generator but also functions as an electric motor. In addition, similarly, the second motor generator MG2 is also an alternating-current synchronous generator that includes a rotor MG2R formed of a permanent magnet and a stator MG2S on which three-phase coils are wound. The rotor MG2R is relatively and rotatably supported to the input shaft 21. The second motor generator MG2 not only functions as an electric motor but also functions as a generator.

Figure 2:
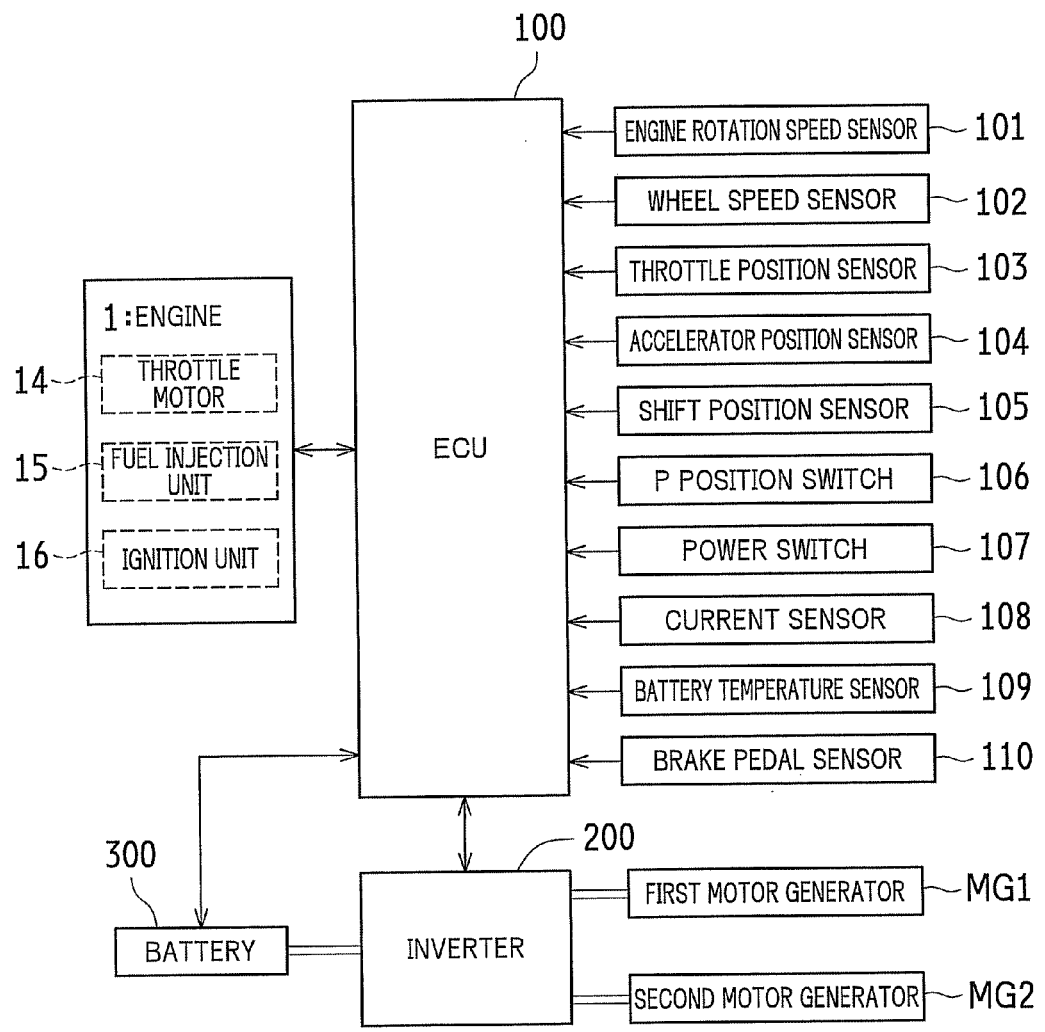
FIG. 2 is a block diagram that shows the configuration of a control system such as an ECU.

As illustrated in FIG. 2, each of the first motor generator MG1 and the second motor generator MG2 are coupled to a battery (an electric storage device) 300 via an inverter 200. The inverter 200 is controlled by the ECU 100. The control by the inverter 200 allows setting regenerations or power running (assist) of the respective motor generators MG1 and MG2. At this time, the regenerative electric power is charged in the battery 300 through the inverter 200. The driving electric powers of the respective motor generators MG1 and MG2 are supplied from the battery 300 through the inverter 200.

—Power Split Mechanism—

As illustrated in FIG. 1, the power split mechanism 3 includes a planetary gear mechanism. The planetary gear mechanism includes a sun gear S3, a pinion gear P3, a ring gear R3, and a planetary carrier CA3. The sun gear S3 is an external gear that rotates about the center of a plurality of gear components. The pinion gear P3 is an external gear that rotates and revolves around the sun gear S3 while being in contact with the outer side of the sun gear S3. The ring gear R3 is an internal gear formed in a hollow cylindrical shape to engage the pinion gear P3. The planetary carrier CA3 supports the pinion gear P3, and rotates with the revolution of the pinion gear P3. The planetary carrier CA3 is coupled to the crankshaft (the output shaft) 10 of the engine 1 via the input shaft 21 and the damper 2.

The power split mechanism 3 transmits at least one driving power of the engine 1 and the second motor generator MG2 to the right and left driving wheels 6L and 6R through the counter drive gear 51, the counter driven gear 52, the final gear 53, the differential unit 54, and the drive shafts 61 and 61.

—Reduction Mechanism—

As illustrated in FIG. 1, the reduction mechanism 4 includes a planetary gear mechanism. The planetary gear mechanism includes a sun gear S4, a pinion gear P4, and a ring gear R4. The sun gear S4 is an external gear that rotates about the center of a plurality of gear components. The pinion gear P4 is an external gear rotatably supported by a planetary carrier (a transaxle case) CA4 and rotates in contact with the outer side of the sun gear S4. The ring gear R4 is an internal gear formed in a hollow cylindrical shape to engage the pinion gear P4. The ring gear R4 of the reduction mechanism 4, the ring gear R3 of the power split mechanism 3, and the counter drive gear 51 are integrated with one another. The sun gear S4 is integrally coupled to the rotor MG2R (the rotary shaft) of the second motor generator MG2 and allows its rotation.

The reduction mechanism 4 decelerates a driving power of the second motor generator MG2 at an appropriate reduction gear ratio. This decelerated driving power is transmitted to the right and left driving wheels 6L and 6R through the counter drive gear 51, the counter driven gear 52, the final gear 53, the differential unit 54, and the drive shaft 61.

—Shift Operation Device—

Figure 3:
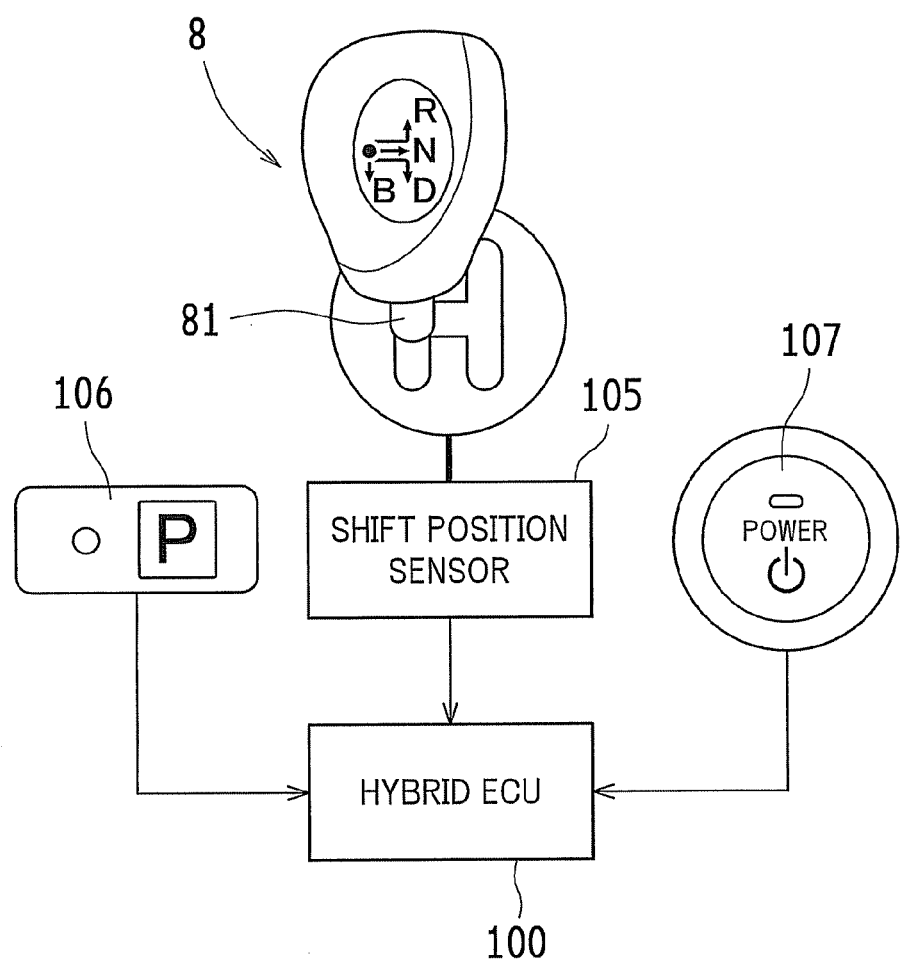
FIG. 3 is a schematic view that shows a shift operating device of a hybrid vehicle illustrated in FIG. 1.

The hybrid vehicle HV in this example includes a shift operating device 8 as illustrated in FIG. 3. The shift operating device 8 includes a shift lever 81 such that the shift lever 81 is movable. The shift operating device 8 in this example has set a forward running drive position (D position), a forward running brake position (B position), a reverse running reverse position (R position), and a neutral position (N position). In the forward running brake position (B position), braking force (engine braking) is large while an accelerator is off. A driver is allowed to move the shift lever 81 to a desired position. Each position of these D position, B position, R position, and N position is detected by a shift position sensor 105. An output signal of the shift position sensor 105 is input to the ECU 100.

In addition, a P position switch 106 is provided near the shift lever 81. The P position switch 106 is used to set a parking position (P position). The P position switch 106 is used to change the shift position between the parking position (P position) and a position other than the parking position (non-P position). When the P position switch 106 is operated by the driver, an operation signal is output to the ECU 100.

—Power Switch—

The hybrid vehicle HV includes a power switch 107 (see FIG. 2 and FIG. 3) to change between start and stop of the hybrid system. The power switch 107 is, for example, a rebounding push switch and, each time the power switch 107 is pushed, the power switch 107 alternately turns on and off. Here, the hybrid system is referred to as a system that employs the engine 1 and the motor generators MG1 and MG2 as driving power sources for running and controls running of the hybrid vehicle HV by executing various controls including operation control over the engine 1, drive control over the motor generators MG1 and MG2, coordinate control over the engine 1 and the motor generators MG1 and MG2, and a similar control.

When an occupant including the driver operates the power switch 107, the power switch 107 outputs a signal corresponding to the operation (an IG-On command signal or an IG-Off command signal) to the ECU 100. The ECU 100 starts or stops the hybrid system on the basis of, for example, the signal output from the power switch 107.

Specifically, when the power switch 107 is operated while the hybrid vehicle HV stops, the ECU 100 starts the hybrid system at the P position. By so doing, the vehicle enters a travelable state. When the stopped hybrid system is started, the hybrid system is started at the P position. Accordingly, even in the accelerator-on state, the driving power is not output. The state where the vehicle is travelable is a state where it is possible to control running of the vehicle by a command signal from the ECU 100, and is a state (Ready-On state) where, when the driver depresses the accelerator, the hybrid vehicle HV is able to start or run. Note that the Ready-On state also includes a state where the engine 1 is stopped and it is possible to cause the hybrid vehicle HV to start or run with the use of the second motor generator MG2.

In addition, for example, while the hybrid system is in operation, when the power switch 107 is operated (for example, pushed in a short period of time) in the P position during a stop of the vehicle, the ECU 100 stops the hybrid system.

Furthermore, in this embodiment, while the hybrid vehicle HV is running (while the hybrid system is in operation), when the power switch 107 is operated (depressed for a long period of time, for example, three seconds), it is possible to stop (IG-Off) the hybrid system. In addition, after the hybrid system is stopped while the vehicle is running, when the power switch 107 is operated (IG-On operation) (restart is requested), it is possible to restart the hybrid system in response to the restart request of the hybrid system. When the hybrid system is started during running, the hybrid system is allowed to start at the position other than the P position, different from the case where the hybrid vehicle HV is stopped, the driving power can be output in the accelerator-on state.

—ECU—

The ECU 100 is an electronic control device that runs the hybrid system described above, and includes a Central Processing Unit (CPU), a Read Only Memory (ROM), a Random Access Memory (RAM), a backup RAM, and a similar component.

The ROM stores various control programs, a map that is referred when the various control programs are executed, and similar data. The CPU executes arithmetic processing based on the various control programs or the map, which are stored in the ROM. The RAM is a memory that temporarily stores a result of an arithmetic operation in the CPU, data input from each sensor, and similar data. The backup RAM is a nonvolatile memory that stores data and similar data to be saved, for example, at ignition Off.

As illustrated in FIG. 2, an engine rotation speed sensor 101, a wheel speed sensor 102, the throttle position sensor 103, an accelerator position sensor 104, the shift position sensor 105, the P position switch 106, the power switch 107, a current sensor 108, a battery temperature sensor 109, a brake pedal sensor 110, and a similar component, are coupled to the ECU 100. The engine rotation speed sensor 101 detects the rotation speed (an engine rotation speed) of the crankshaft 10, which is the output shaft of the engine 1. The wheel speed sensor 102 detects the rotation speed of wheels (vehicle speed). The throttle position sensor 103 detects the opening degree of the throttle valve 13 of the engine 1. The accelerator position sensor 104 detects the opening degree of an accelerator pedal 7 (see FIG. 1). The current sensor 108 detects a charge/discharge current to or from the battery 300. The brake pedal sensor 110 detects depression force on a brake pedal (brake depression force). Furthermore, sensors that indicate operation states of the engine 1, such as a water temperature sensor and an air flow meter, are coupled to the ECU 100. The water temperature sensor detects an engine coolant water temperature. The air flow meter detects the air intake quantity. Signals from each of these sensors are input to the ECU 100.

The ECU 100 is coupled to the throttle motor 14, which drives the throttle valve 13 of the engine 1 to open and close, a fuel injection unit (an injector) 15, an ignition unit 16, and a similar unit.

For example, when the hybrid system is started (Ready-On) by operating the power switch 107, the ECU 100 calculates request driving power Pr on the basis of an actual accelerator position Acc, which is obtained from an output signal from the accelerator position sensor 104, using, for example, a map (arithmetic expression). Using the request driving power Pr as a target driving power, the ECU 100 controls driving power output from the hybrid system (the engine 1, the motor generators MG1 and MG2), which is a driving power source, to the driving wheels 6L and 6R. Based on the accelerator position Acc and a vehicle speed V, the request driving power Pr may be calculated with reference to, for example, a map. Based on an accelerator position moderating value Accs, which will be described later, the request driving power Pr may be calculated.

Furthermore, in order to manage the battery 300, the ECU 100 operates, for example, a state of charge (SOC) of the battery 300 and an input limit Win and output limit Wout of the battery 300, on the basis of an accumulated value of charge/discharge current detected by the current sensor 108, the battery temperature detected by the battery temperature sensor 109, or a similar value.

The inverter 200 is coupled to the ECU 100. The inverter 200 includes intelligent power modules (IPMs) for respectively controlling the motor generators MG1 and MG2. Each of the IPMs is formed of a plurality of (for example, six) semiconductor switching elements (for example, insulated gate bipolar transistors (IGBTs)), or a similar component.

The inverter 200, for example, converts a direct current from the battery 300 into a current for driving the motor generators MG1 and MG2 according to a command signal from the ECU 100 (for example, a torque command value of the first motor generator MG1 and a torque command value of the second motor generator MG2). Meanwhile, the inverter 200 converts alternating current generated by the first motor generator MG1 with the power of the engine 1 and alternating current generated by the second motor generator MG2 with regenerative braking to direct current for charging the battery 300. In addition, the inverter 200 supplies alternating current generated by the first motor generator MG1 as driving electric power for the second motor generator MG2 depending on a running state.

Furthermore, the ECU 100 performs the following "running mode control" and "control during restart after system stop during running."

—Running Mode Control—

The hybrid vehicle HV according to this embodiment runs using the second motor generator MG2 only (hereinafter also referred to as "EV running") when an operational efficiency of the engine 1 is poor, for example, at the start of running and at low-speed running. The EV running is also performed in the case where the driver selects an EV running mode using a running mode selection switch that is disposed in the vehicle interior.

On the other hand, during normal running, for example, the power split mechanism 3 splits a power of the engine 1 into two paths (torque split). One power directly drives the driving wheels 6L and 6R (drive by direct torque). The other power drives the first motor generator MG1 to generate electric power. At this time, the generated electric power drives the second motor generator MG2 to assist driving of the driving wheels 6L and 6R (drive through an electric path).

Thus, the power split mechanism 3 functions as a differential mechanism. This differential operation mechanically transmits a main part of the power from the engine 1 to the driving wheels 6L and 6R. The rest of the power from the engine 1 is electrically transmitted using the electric path from the first motor generator MG1 to the second motor generator MG2. This provides a function as a transmission that electrically changes a gear ratio. This allows freely operating engine rotation speed and engine torque without depending on the rotation speed and the torque of the driving wheels 6L and OR (ring gears R3 and R4). This allows obtaining an operating state of the engine 1 where a fuel consumption rate is optimized while obtaining a driving power required for the driving wheels 6L and 6R.

At high-speed running, an electric power from the battery (a battery for running) 300 is additionally supplied to the second motor generator MG2. Thus, the output of the second motor generator MG2 is increased to add a driving power to the driving wheels 6L and OR (assist of the driving power, power running).

Additionally, at deceleration, the second motor generator MG2 functions as an electric generator, and generates regenerative power to store the recovered electric power in the battery 300. In the case where a charge amount of the battery 300 is reduced and charge is especially required, the output of the engine 1 is increased to increase the electricity amount generated by the first motor generator MG1. This consequently increases the charge amount for the battery 300. Surely, even at low-speed running, a control to increase the driving power of the engine 1 may be performed as necessary. For example, this control is performed in the case where the battery 300 is required to be charged as described above, in the case where accessories such as an air conditioner are driven, in the case where a temperature of cooling water of the engine 1 is increased to a predetermined temperature, in the case where the vehicle is suddenly-accelerated, or a similar case.

Additionally, the hybrid vehicle HV according to the embodiment stops the engine 1 to improve fuel consumption in the case where an EV running condition, which is determined based on an operating state of the hybrid vehicle HV, a state of the battery 300, and a similar parameter, is satisfied. In the case where the EV running condition is not satisfied, the engine 1 is started again. Thus, in the hybrid vehicle HV, the engine 1 intermittently operated even in an ignition On position.

—Control during Restart after System Stop during Running—

First, in this embodiment, while the hybrid vehicle HV is running (while the hybrid system is in operation), when the power switch 107 is operated, it is possible to stop the hybrid system as described above. In addition, after the hybrid system is stopped while the vehicle is running, when the hybrid system is requested to restart by operation of the power switch 107, it is possible to restart the hybrid system in response to the restart request.

Here, while the hybrid vehicle HV is running, when an occupant including the driver operates the power switch 107 (performs Off operation), the hybrid system is stopped (IG-Off state). If the hybrid system stops, the driving power from the hybrid system (the engine 1, the motor generators MG1 and MG2) to the driving wheels 6L and 6R is exhausted. At this time, to obtain the driving power, if the driver operates the power switch 107 (restart request) while depressing the accelerator pedal 7 (accelerator-on state), the driving power is suddenly generated (recovered). This may deteriorate drivability.

The restart request means a request output by the start operation of the hybrid system. The restart request is made after the stop operation is performed on the hybrid system while the hybrid vehicle HV is running and before the hybrid vehicle HV stops running (during freewheeling). Specifically, the restart request is a signal output from the power switch 107 to the ECU 100 by operating the power switch 107 by the driver or a similar person.

Considering this point, the embodiment features the following. If the restart in the accelerator-on state is requested on the hybrid system after stop operation of the hybrid system is performed during running of the hybrid vehicle HV, the hybrid system controls so that the driving power output to the driving wheels 6L and 6R may be gradually increased. This reduces deterioration of drivability at the time of recovery of the driving power.

The exemplary specific control (control during restart request after the hybrid system is stopped during running) will be described with reference to the flowchart in FIG. 4.

Figure 4:
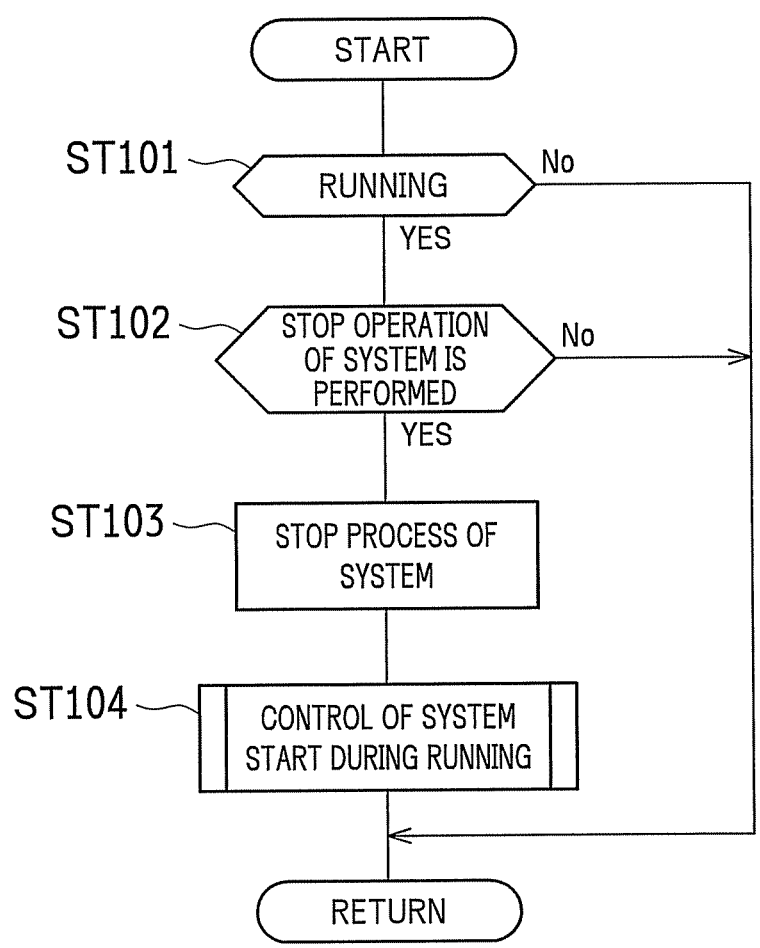
FIG. 4 is a flowchart that shows an example of a control during restart after a hybrid system stop operation is performed during running of the vehicle.

A control routine illustrated in FIG. 4 is repeatedly executed by the ECU 100 at predetermined time intervals (for example, intervals of several msec).

First, in step ST101, it is determined whether the hybrid vehicle HV is running or not on the basis of the vehicle speed V calculated from the output signal from the wheel speed sensor 102. When the determination result is negative (NO), the process returns. When the determination result in step ST101 is affirmative (YES) (while the vehicle is running), the process proceeds to step ST102.

In step ST102, while the vehicle is running (while the hybrid system is in operation), it is determined whether the stop operation of the hybrid system is performed (for example, the power switch 107 is pressed for a long period of time) or not on the basis of the output signal from the power switch 107. When the determination result is negative (NO), the process returns. When the determination result in step ST102 is affirmative (YES) (the stop operation of the hybrid system is performed during running), the process proceeds to step ST103.

Step ST103 performs a stop process of the hybrid system. The process of stopping the hybrid system, for example, includes stopping the engine 1 through fuel cut, or a similar method, stopping the driving of the motor generators MG1 and MG2 through gate interruption of the inverter 200, interrupting the system main relay. The system main relay is used to couple or interrupt the battery 300 to or from the inverter 200.

After termination of the stop process of the hybrid system in the above-described step ST103, in step ST104, subroutine for control of system start during running is executed. The control of system start during running subroutine will be described with reference to FIG. 5.

Figure 5:
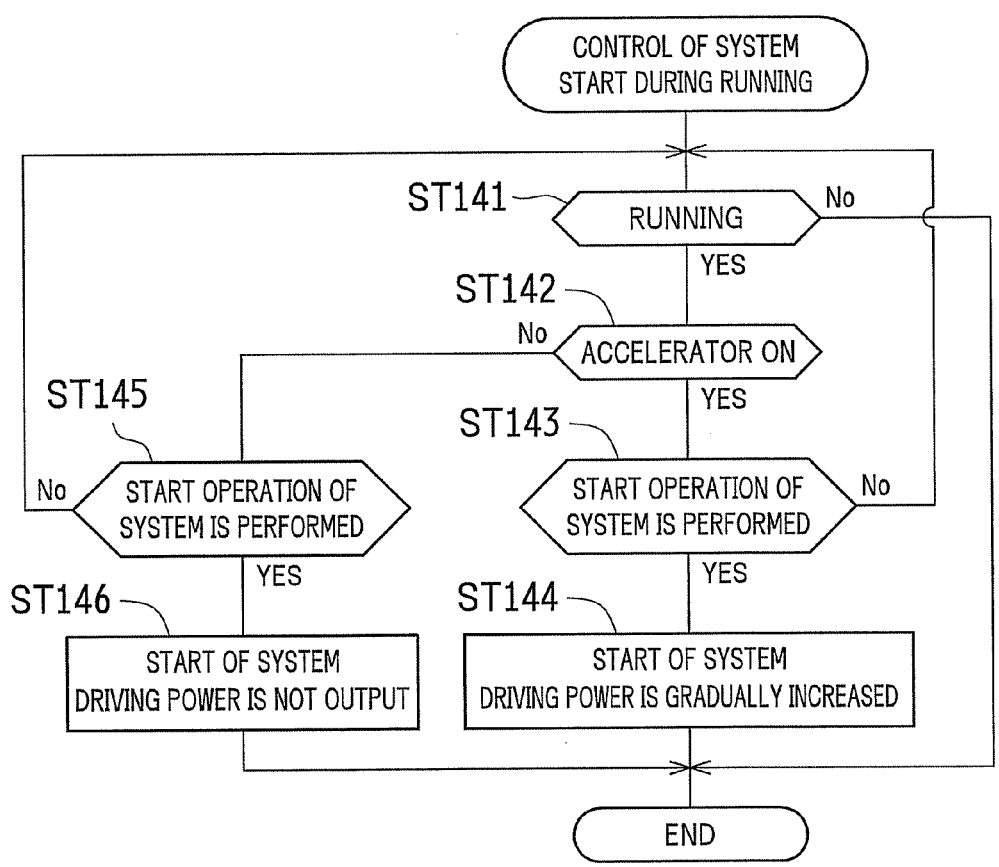
FIG. 5 is a flowchart that shows an example of a control of system start during running.

When the subroutine illustrated in FIG. 5 is started, first, in step ST141, it is determined whether the hybrid vehicle HV is running or not on the basis of the vehicle speed V calculated from the output signal from the wheel speed sensor 102. When the determination result is negative (NO), the subroutine process is terminated and the process returns to the main routine. When the determination result in step ST141 is affirmative (YES), the process proceeds to step ST142.

In step ST142, it is determined whether the accelerator pedal 7 is depressed or not (whether the accelerator-on state or not) on the basis of the output signal from the accelerator position sensor 104. When the determination result is affirmative (YES) (accelerator-on during vehicle running), the process proceeds to step ST143.

In step ST143, it is determined whether the restart operation of the hybrid system is performed (for example, the power switch 107 is pushed for a short period of time) or not on the basis of the output signal from the power switch 107. When the determination result in step ST143 is negative (NO), the process returns to ST141 and determination is performed again. In this redetermination, when the determination results of step ST141 and step ST142 are both affirmative (YES) and the determination result of step ST143 is negative (NO), the processes of these step ST141 to step ST143 are repeated.

Further, when the determination result of step ST143 is negative (NO) and the determination result of step ST141 is negative (NO), that is, the hybrid vehicle HV stops while the restart operation of the hybrid system is not performed, this subroutine process is terminated and returns to the main routine. On the other hand, when the determination result of step ST143 is affirmative (YES) while the determination results of step ST141 and step ST142 are both affirmative (YES), that is, in the case where the restart operation of the hybrid system is performed (restart is requested on the hybrid system) in the accelerator-on state during running of the hybrid vehicle HV, the accelerator position at this point is obtained (obtained from the output signal from the accelerator position sensor 104), and the process proceeds to step ST144. The process in step ST144 will be described later. The "restart request of the hybrid system" corresponds to "restart request of the driving power source" of the present invention.

When the determination result of step ST142 is negative (NO) while the determination result of step ST141 is affirmative (YES), that is, an accelerator-off state during running of the hybrid vehicle HV, the process proceeds to step ST145.

In step ST145, it is determined whether the restart operation of the hybrid system is performed or not by the same process as step ST143. When the determination result is negative (NO), the process returns to step ST141 and determination is performed again. In this redetermination, when the determination result of step ST141 is affirmative (YES) and the determination results of step ST142 and step ST145 are both negative (NO), the processes of these step ST141, step ST142, and step ST145 are repeated.

Further, when the determination result of step ST145 is negative (NO) and the determination result of step ST141 is negative (NO), that is, the hybrid vehicle HV stops while the restart operation of the hybrid system is not performed, this subroutine process is terminated and returns to the main routine. On the other hand, when the determination result of step ST141 is affirmative (YES) and the determination result of step ST142 is negative (NO) while the determination result of step ST145 is affirmative (YES), that is, in the case where the restart operation of the hybrid system is performed (restart is requested on the hybrid system) in the accelerator-off state during running of the hybrid vehicle HV, the process proceeds to step ST146.

In step ST146, the hybrid system is restarted to recover the hybrid vehicle HV to a travelable state (Ready-On state). Specifically, the system is checked and the system main relay is coupled after completion of the system check to make the motor generators MG1 and MG2 be drivable. However, in this step ST145, the hybrid vehicle HV is only recovered to the Ready-On state, and the driving power is not output to the driving wheels 6L and 6R. If the EV running condition is not satisfied and the engine 1 needs to be started, the output torque at the start of the engine 1 is prevented to be transmitted to the driving wheels 6L and 6R.

(Process in Step ST144)

Next, the process of step ST144 will be described.

In this step ST144, the hybrid system is restarted with the process same as step ST146 and recovers the vehicle to be a travelable state (the Ready-On state) to make the motor generators MG1 and MG2 be drivable. If the EV running condition is not satisfied, the engine 1 is started, and the output driving power to the driving wheels 6L and 6R is controlled.

Here, restart of the hybrid system in step ST144 is a system restart when the restart is requested on the hybrid system in the accelerator-on state. If the output driving power of the hybrid system (the engine 1, the motor generators MG1 and MG2) is controlled based on the actual accelerator position Acc (the accelerator position Acc obtained in step ST143) upon the restart request, as described above, the driving power is suddenly generated (recovered), thus deteriorating drivability. Therefore, in this embodiment, in the restart request of the hybrid system in the accelerator-on state, the driving power (driving power output to the driving wheels 6L and 6R) is gradually increased, thus reducing deterioration of drivability in recovery of the driving power.

Figure 6:
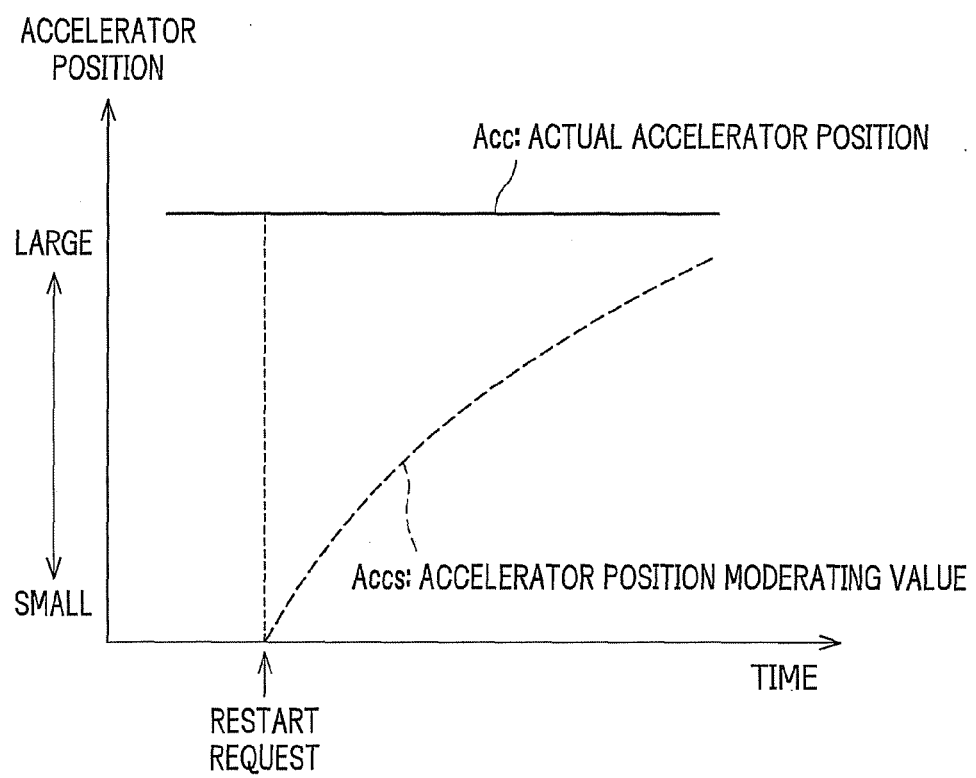
FIG. 6 shows an example of an accelerator position moderating value employed for restart of the hybrid system.

Specifically, as illustrated in FIG. 6, a moderating process is performed on the actual accelerator position Acc upon the restart request of the hybrid system with the following expression (1) to calculate the accelerator position moderating value Accs. Based on the calculated accelerator position moderating value Accs, the request driving power during restart Prs (moderating value of the request driving power) is calculated. Using the request driving power during restart Prs as a target driving power, the hybrid system (the engine 1, the motor generators MG1 and MG2), which is a driving power source, is controlled to gradually increase the driving power (output driving power from the hybrid system) output to the driving wheels 6L and 6R. The control to gradually increase the driving power may also be referred to as "driving power moderating control at restart."

$$\text{Accs}(i) = \text{Accs}(i-1) + (\text{Acc}(i) - \text{Accs}(i-1))/K \qquad (1)$$

In this expression (1), Acc (i) denotes the actual accelerator position (constant in the example of FIG. 6), and Accs (i−1) denotes the previous accelerator position moderating value. "K" denotes a moderating coefficient. As the moderating coefficient K increases, smoothing degree of the accelerator position moderating value Accs, that is, a degree of increase in the request driving power (driving power for running) (an increasing rate of the driving power) decreases. The expression (1) is performed iteratively for an infinitesimal period (for example, a several msec).

As described above, according to the embodiment, in the case where the stop operation of the hybrid system is performed during running of the hybrid vehicle HV and then the restart is requested on the hybrid system in the accelerator-on state, the driving power corresponding to the accelerator position Acc at the time of the restart request is not directly output. Instead, the hybrid system is controlled based on the accelerator position moderating value Accs (see FIG. 6) where the moderating process is performed on the accelerator position Acc. Accordingly, the driving power is output to the driving wheels 6L and 6R while being gradually increased, reducing deterioration of drivability in recovery of the driving power.

In the embodiment, the moderating coefficient K for the moderating process on the actual accelerator position Acc may be a constant value, or as described later, the moderating coefficient K may be set variable corresponding to the actual accelerator position Acc.

In the embodiment, for example, assume that the stop operation of the hybrid system is performed during running of the hybrid vehicle HV and then the restart is requested on the hybrid system in the accelerator-on state. Then, if the accelerator position upon the restart request and the accelerator position during the system stop do not make large difference (or the accelerator position during restart is small) and therefore drivability is less likely to be deteriorated, the driving power moderating control at restart may be reduced or may not be performed.

In this case, during running of the hybrid vehicle HV, when accelerator position difference (accelerator position when the system is restarted–accelerator position when the system is stopped) based on the difference between the accelerator position upon stop of the hybrid system and the accelerator position upon the restart request of the hybrid system is equal to or more than the predetermined determination value, it is only necessary to perform the driving power moderating control at restart. If the accelerator position difference is smaller than the determination value, it is only necessary not to perform the driving power moderating control at restart. When the driving power moderating control at restart is not performed, the driving power corresponding to the accelerator position Acc is output to the driving wheels 6L and 6R. The determination value employs a value fitted by experiment, simulation, or a similar method.

In the embodiment, for example, in the case where the time from when the stop operation of the hybrid system is performed during running of the hybrid vehicle HV until when the restart is requested on the hybrid system in the accelerator-on state is short and therefore drivability is less likely to be deteriorated, the driving power moderating control at restart may be reduced or may not be performed.

(Modification 1)

Next, a modification of the above-described (Embodiment 1) will be described.

This example features in that the moderating coefficient K is set variable corresponding to the actual accelerator position Acc at the restart of the hybrid system. The specific example will be described below.

First, in the case where the actual accelerator position Acc is large when the restart is requested on the hybrid system in the accelerator-on state, compared with the case where the accelerator position Acc is small, since the driving power rises suddenly, there is a tendency that the larger the actual accelerator position Acc, the larger a degree of deterioration of drivability is. Focusing on the point, in this example, in the case where the actual accelerator position Acc when the restart is requested on the hybrid system in the accelerator-on state is large, the moderating coefficient K for the moderating process (the expression (1)) is set larger compared with small actual accelerator position Acc. This setting ensures more effective reduction of deterioration of drivability when the amount of accelerator operation upon hybrid system restart request is large. In this case, the larger the moderating coefficient K for the moderating process (the expression (1)) may be set, the larger the actual accelerator position Acc is when there has been a request to restart the hybrid system in the accelerator-on state.

(Modification 2)

Next, another modification of the above-described (Embodiment 1) will be described.

In the case where the stop operation of the hybrid system is performed and then the restart is requested on the hybrid system in the accelerator-on state, and the accelerator operation is repeatedly performed between on and off after the system restart request, this example features in that every time the accelerator-on operation is performed, a degree of increase (increasing rate of the driving power) where the driving power (driving power output to the driving wheels 6L and 6R) is increased is gradually increased.

Figure 7:
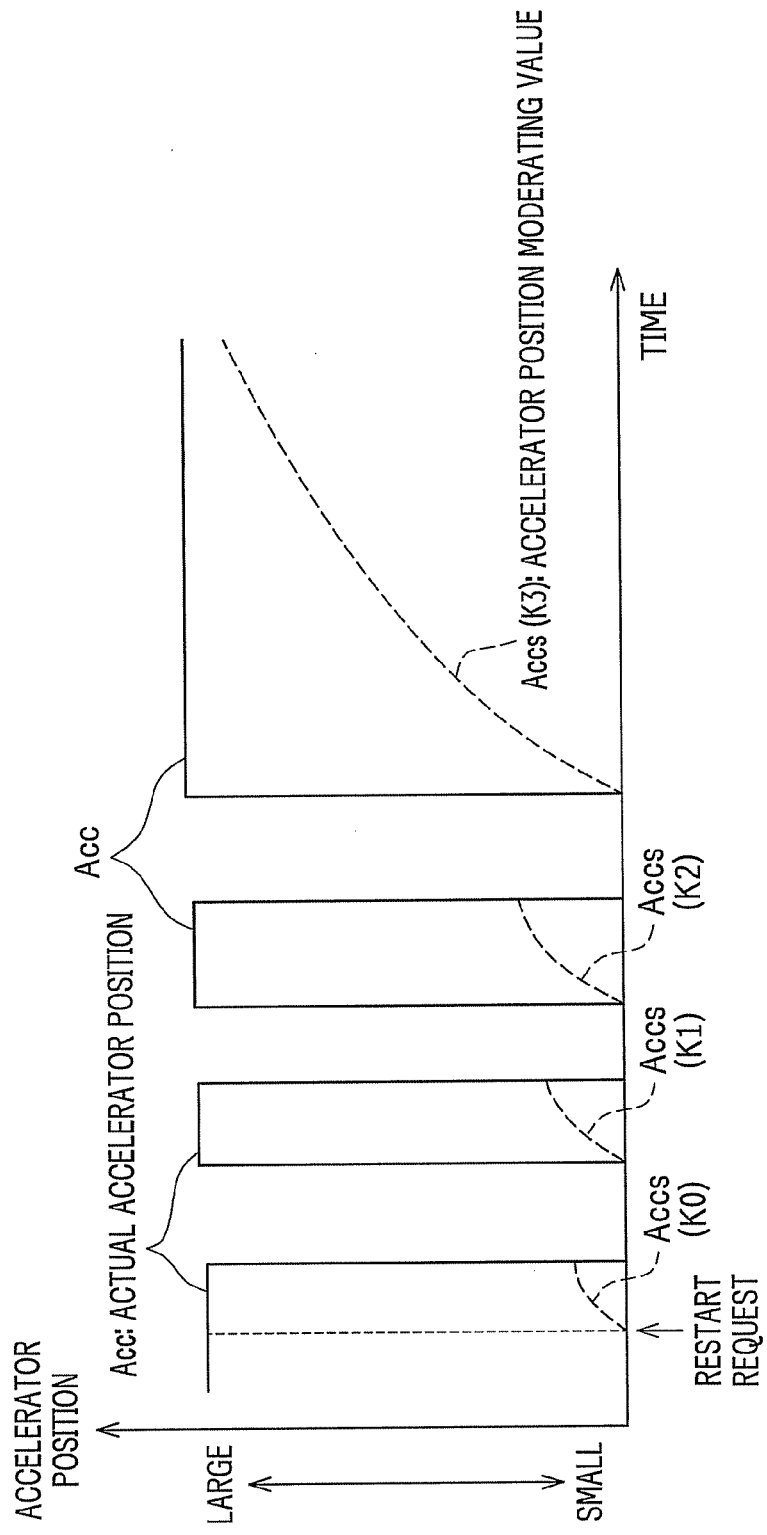
FIG. 7 shows another example of an accelerator position moderating value employed for restart of the hybrid system.

Specifically, as illustrated in FIG. 7, when the restart is requested on the hybrid system and then the accelerator operation is performed between on and off by, for example, three times, a moderating coefficient K0 employed for calculation of the accelerator position moderating value Accs during the hybrid system restart request is set to a maximum value. Thereafter, a control that sequentially decreases moderating coefficients K1, K2, and K3 every time the accelerator-on operation is performed. This control ensures gradual increase in degree of increase of the driving power (driving power output to the driving wheels 6L and 6R) as the number of accelerator-on operations increases. This ensures smooth increase of the driving power even if the accelerator operation is repeatedly performed between on and off after the restart request of the hybrid system, reducing deterioration of drivability.

(Embodiment 2)

The above-described (Embodiment 1) describes an example where the present invention is applied to the hybrid vehicle HV with the two motor generators MG1 and MG2. However, the present invention should not be construed in a limiting sense. The present invention is also applicable to the hybrid vehicle with one motor generator. This exemplary hybrid vehicle will be described with reference to FIG. 8.

The vehicle in this example is a front-engine rear-wheel drive (FR) system hybrid vehicle 400. The hybrid vehicle 400 includes an engine 401, a motor generator (MG) 403, a transmission (for example, step-gear automatic transmission and continuously variable transmission) 405, an inverter 411, a battery 412, an ECU 410, and a similar component. The inverter 411 drives the motor generator 403. The battery 412 supplies electric power for driving the motor generator 403, and stores electric power generated by the motor generator 403. The engine 401 and the motor generator 403 are coupled via a first clutch 402. In addition, the motor generator 403 and the transmission 405 are coupled via a second clutch 404.

Figure 8:
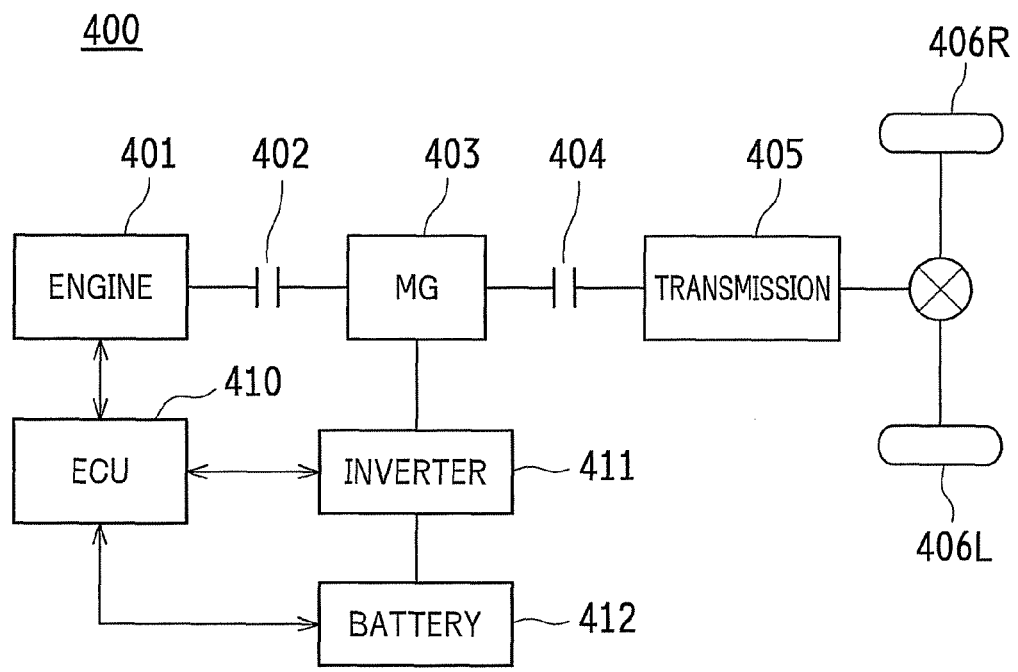
FIG. 8 is a schematic configuration diagram that shows another example of a vehicle to which the present invention is applied.

The hybrid vehicle 400 illustrated in FIG. 8 is able to drive driving wheels (rear wheels) 406L and 406R with the use of the motor generator 403 alone by interrupting (releasing) the first clutch 402 and coupling (engaging) the second clutch 404.

In addition, by coupling (engaging) both the first clutch 402 and the second clutch 404, it is possible to drive the driving wheels 406L and 406R by the driving power of the engine 401, and it is possible to carry out charging or generate assist torque with the use of the motor generator 403. The hybrid vehicle 400 in the example also includes a power switch used to change between start and stop of a hybrid system (the engine 401, the motor generator 403), which is a driving power source.

In this embodiment as well, similarly to the above-described (Embodiment 1), in the case where the stop operation of the hybrid system (the engine 401, the motor generator 403), which is a driving power source, is performed during running of the hybrid vehicle 400 and then the restart is requested on the hybrid system in the accelerator-on state, the driving power corresponding to the accelerator position Acc at the time of the restart request is not directly output. Instead, the above-described driving power moderating control at restart (driving power control using the accelerator position moderating value Accd) is performed. Accordingly, the driving power is output to the driving wheels 406L and 406R while being gradually increased, reducing deterioration of drivability in recovery of the driving power. Similarly to the above-described (Embodiment 1), the ECU 410 performs the driving power moderating control at restart.

(Embodiment 3)

Figure 9:
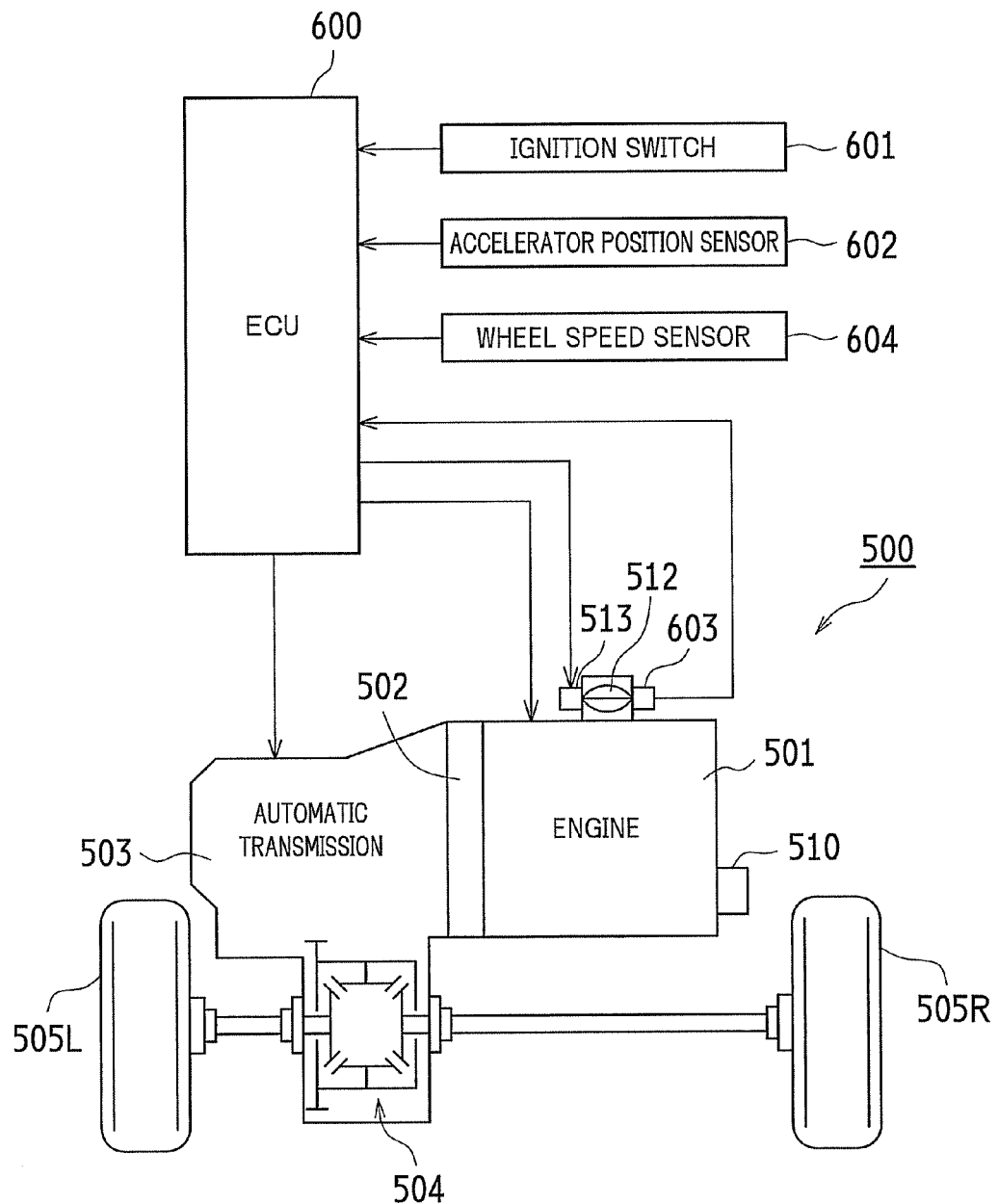
FIG. 9 is a schematic configuration diagram that shows yet another example of a vehicle to which the present invention is applied.

FIG. 9 is a schematic configuration diagram that shows yet another example of a vehicle to which the present invention is applied.

An exemplary vehicle 500 is a conventional FF-type vehicle. The vehicle 500 includes an engine (internal combustion engine) 501, which is a power source for running, a torque converter 502, an automatic transmission 503, a differential unit 504, an ECU 600, and a similar component.

A crankshaft, which is an output shaft of the engine 501, is coupled to the torque converter 502. An output from the engine 501 is transmitted from the torque converter 502 to the differential unit 504 via the automatic transmission 503 or a similar component and then is distributed to right and left driving wheels 505L and 505R.

The exemplary engine 501 is also a known power unit (internal combustion engine), which burns fuel to output power, such as a gasoline engine and a diesel engine. Additionally, the engine 501 can control an operating state such as a throttle position (air intake quantity) of a throttle valve 512 disposed in an intake passage, a fuel injection quantity, and an ignition timing. Exhaust gas after burning is discharged to the outside air through an exhaust passage (not illustrated) after being purified by an oxidation catalyst (not illustrated).

A starter motor 510 is coupled to the crankshaft of the engine 501. This starter motor 510 allows cranking (motoring) at a start of the engine 501.

The automatic transmission 503 is a stepped automatic transmission that sets a transmission gear using, for example, a frictional engagement apparatus such as a clutch and a brake and a planetary gear train. In the form of the automatic transmission, another transmission such as a belt-type continuously variable transmission may be employed.

An ignition switch 601, an accelerator position sensor 602, a wheel speed sensor 604, various sensors, a shift position sensor, and a similar unit are coupled to the ECU 600. The accelerator position sensor 602 detects a degree of opening of an accelerator pedal. The wheel speed sensor 604 detects a rotation speed of a wheel (vehicle speed). The various sensors indicate the operating state of the engine 501 including a throttle position sensor 603 (for example, an engine rotation speed, an engine water temperature, an air intake quantity, an intake temperature, or a similar status). The shift position sensor detects the shift position of the automatic transmission 503.

Then, the ECU 600 controls the driving power of the engine 501. Specifically, based on the actual accelerator position Acc obtained from the output signal from the accelerator position sensor 602, the request driving power Pe of the engine 501 is calculated using, for example, a map (arithmetic expression). Using the request driving power Pe as a target driving power, the ECU 600 controls driving power (driving power output to the driving wheels 505L and 505R) from the engine 501, which is a driving power source. Based on the accelerator position Acc and the vehicle speed V, the request driving power Pe may be calculated with reference to, for example, a map. Based the an accelerator position moderating value Accs, which will be described later, the request driving power Pr may be calculated.

Furthermore, the ECU 600 performs the following "control of restart after IG-Off during running."

—Control of Restart after IG-Off during Running—

First, in this embodiment, when the ignition switch 601 is operated during running of the vehicle 500 to be in an IG-Off state, the engine 501 is stopped. If the stop operation of the engine 501 is performed during running of the vehicle and then the engine restart is requested by the operation of the ignition switch 601 (IG-Off to IG-On), the engine 501 can be restarted corresponding to the engine restart request.

Here, assume that an occupant including the driver operates the ignition switch 601, entering an IG-Off state while the vehicle 500 is running. Then, a driving power from the engine 501 to the driving wheels 505L and 505R is exhausted. The driver depresses the accelerator pedal so as to obtain the driving power. In this state (the accelerator pedal is depressed), if the driver notices the incorrect operation of the ignition switch 601, operates the ignition switch 601, and makes the restart request (IG-On), the driving power is suddenly generated (recovered), thus deteriorating drivability.

Considering this point, the embodiment features the following. If the restart (IG-On) in the accelerator-on state is requested on the engine 501 after the engine 501 is stopped (IG-Off) during running of the vehicle 500, a control to gradually increase the driving power output from the engine 501 to the driving wheels 505L and 505R is performed. This reduces deterioration of drivability at the time of recovery of the driving power.

The exemplary specific control (control when the restart is requested after the engine is stopped during running) will be described with reference to the flowchart in FIG. 10.

Figure 10:
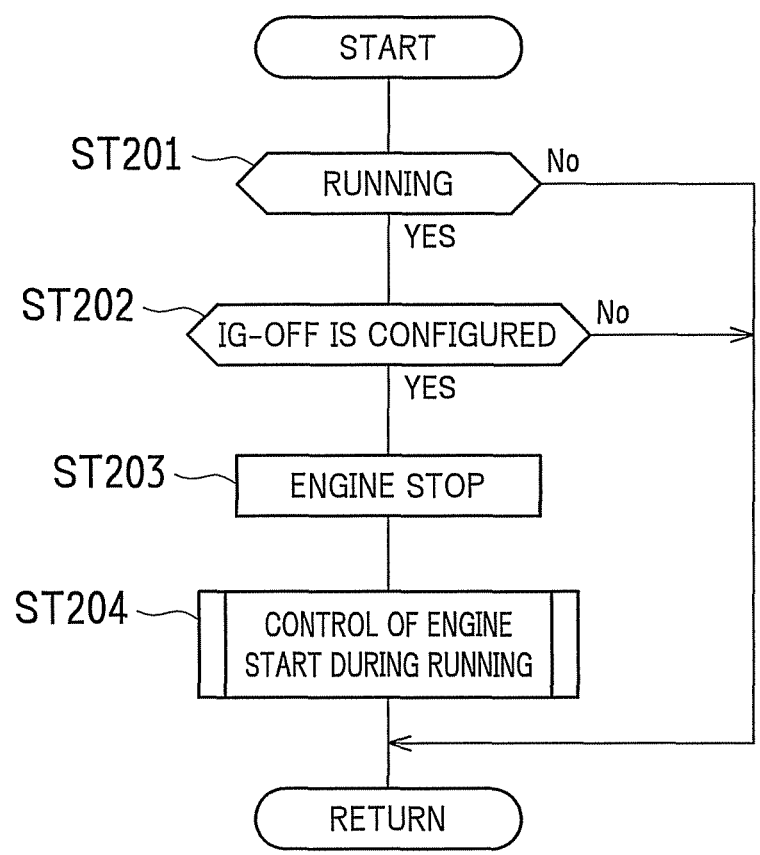
FIG. 10 is a flowchart that shows an example of a control during restart after an engine stop operation is performed during running of the vehicle.

A control routine illustrated in FIG. 10 is repeatedly executed by the ECU 600 at predetermined time intervals (for example, intervals of several msec).

First, in step ST201, it is determined whether the vehicle 500 is running or not on the basis of the vehicle speed V calculated from the output signal from the wheel speed sensor 604. When the determination result is negative (NO), the process returns. When the determination result in step ST201 is affirmative (YES) (while the vehicle is running), the process proceeds to step ST202.

In step ST202, it is determined whether the ignition switch 601 is operated during running of the vehicle to be "IG-Off" or not. When the determination result is negative (NO), the process returns. When the determination result in step ST202 is affirmative (YES) (IG-Off is configured), the process proceeds to step ST203.

In step ST203, the engine 501 is stopped through fuel cut or a similar method. Even if the engine 501 is stopped, the crankshaft of the engine 501 and the driving wheels 505L and 505R are maintained to be coupled via, for example, the automatic transmission 503.

Next, in step ST204, subroutine of control of engine start during running is performed. This control of system start during running subroutine will be described with reference to FIG. 11.

Figure 11:
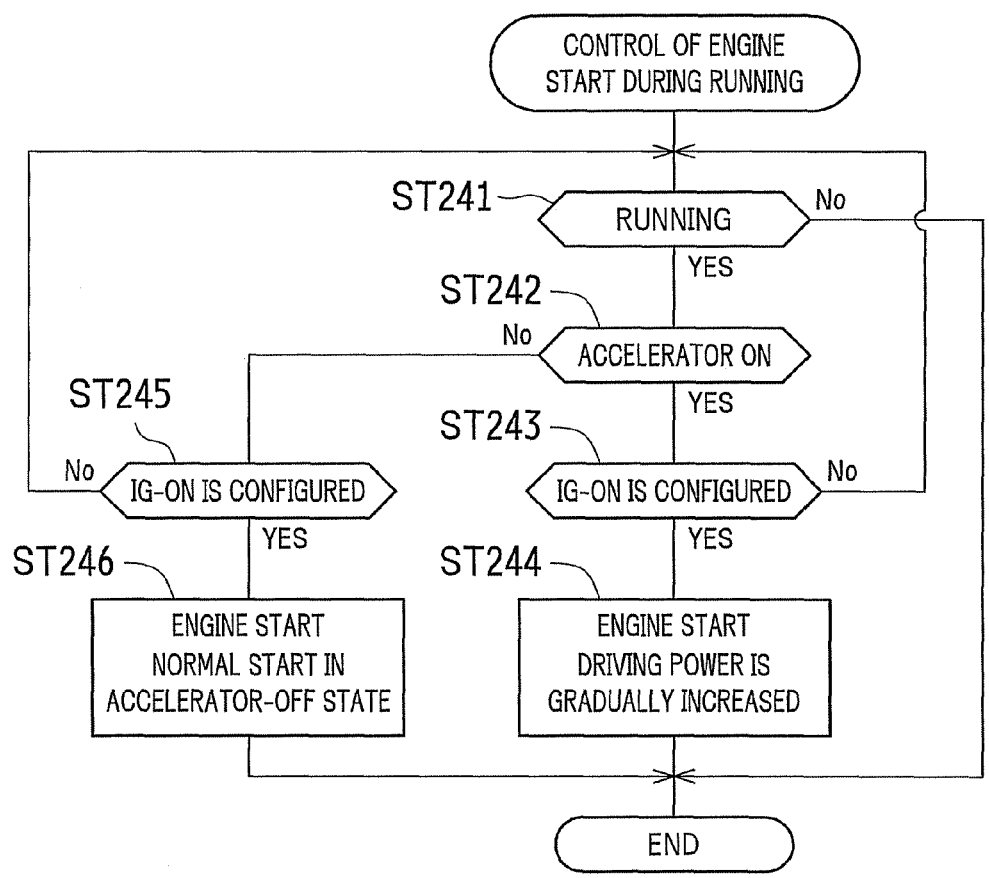
FIG. 11 is a flowchart that shows an example of a control of engine start during running.

When the subroutine illustrated in FIG. 11 is started, first, in step ST241, it is determined whether the vehicle 500 is running or not on the basis of the vehicle speed V calculated from the output signal from the wheel speed sensor 604. When the determination result is negative (NO), the subroutine process is terminated and the process returns to the main routine. When the determination result in step ST241 is affirmative (YES), the process proceeds to step ST242.

In step ST242, it is determined whether the accelerator pedal is depressed or not (whether the accelerator-on state or not) on the basis of the output signal from the accelerator position sensor 602. When the determination result is affirmative (YES) (accelerator-on during vehicle running), the process proceeds to step ST243.

In step ST243, it is determined whether the restart is requested on the engine 501 (IG-Off to IG-On) or not on the basis of the output signal from the ignition switch 601. When the determination result is negative (NO), the process returns to ST241 and determination is performed again. In this redetermination, when the determination results of step ST241 and step ST242 are both affirmative (YES) and the determination result of step ST243 is negative (NO), the processes of these step ST241 to step ST243 are repeated.

Further, when the determination result of step ST243 is negative (NO) and the determination result of step ST241 is negative (NO), that is, the vehicle 500 stops while the restart (IG-On) is not requested on the engine 501, this subroutine process is terminated and returns to the main routine. On the other hand, when the determination result of step ST243 is affirmative (YES) while the determination results of step ST241 and step ST242 are both affirmative (YES), that is, in the case where the restart is requested on the engine 501 (IG-On is configured) in the accelerator-on state during running of the vehicle 500, the accelerator position at the point is obtained (obtained from the output signal from the accelerator position sensor 602) and the process proceeds to step ST244. The process in step ST244 will be described later. The "restart request of the engine" corresponds to "restart request of the driving power source" of the present invention.

When the determination result of step ST242 is negative (NO) while the determination result of step ST241 is affirmative (YES), that is, the accelerator-off state during running of the vehicle 500, the process proceeds to step ST245.

In step ST245, it is determined whether the restart is requested (IG-Off to IG-On) on the engine 501 or not on the basis of the output signal from the ignition switch 601. When the determination result is negative (NO), the process returns to step ST241 and the determination is performed again. In this redetermination, when the determination result of step ST241 is affirmative (YES) and the determination results of step ST242 and step ST245 are both negative (NO), the processes of these step ST241, step ST242, and step ST245 are repeated.

Further, when the determination result of step ST245 is negative (NO) and the determination result of step ST141 is negative (NO), that is, the vehicle 500 stops while the restart is not requested on the engine 501, this subroutine process is terminated and returns to the main routine. On the other hand, when the determination result of step ST241 is affirmative (YES) and the determination result of step ST242 is negative (NO) while the determination result of step ST245 is affirmative (YES), that is, in the case where the restart is not requested on the engine 501 (IG-On is configured) in the accelerator-off state during running of the vehicle 500, the process proceeds to step ST246.

In step ST246, the engine 501 is restarted. Specifically, driving the starter motor 510 (see FIG. 9) and cranking the engine 501 restarts the engine 501. However, the start of the engine 501 in this step ST246 is a start in the accelerator-off state; therefore, the output driving power of the engine 501 is small (just a self-sustaining operation), less affecting drivability.

(Process in Step ST244)

Next, the process of step ST244 will be described.

In this step ST244, the engine 501 is restarted and the output driving power to the driving wheels 505L and 505R is controlled.

Here, the restart of the engine 501 in step ST206 is a restart of the engine 501 when the restart is requested on the engine in the accelerator-on state. If the output driving power of the engine 501 is controlled based on the accelerator position Acc (accelerator position Acc obtained in step ST205) upon the restart request, as described above, the driving power is suddenly generated (recovered), thus deteriorating drivability. Therefore, in this embodiment, in the restart request of the engine in the accelerator-on state, the output driving power of the engine 501 is gradually increased, thus reducing deterioration of drivability in recovery of the driving power.

Specifically, similarly to the above-described (Embodiment 1), a moderating process is performed on the actual accelerator position Acc upon the restart request of the engine with the above-described expression (1) so as to calculate the accelerator position moderating value Accs (see FIG. 6). Based on the calculated accelerator position moderating value Accs, the request driving power during restart Pes (moderating value of the request driving power) is calculated. Using the request driving power during restart Pes as a target driving power, the engine 501, which is a driving power source, is controlled to gradually increase the driving power output to the driving wheels 505L and 505R. The control to gradually increase the driving power may also be referred to as "driving power moderating control at restart."

As described above, according to the embodiment, in the case where the stop operation of the engine 501 is performed during running of the vehicle 500 and then the restart is requested on the engine in the accelerator-on state, the driving power corresponding to the accelerator position Acc at the time of the restart request is not directly output. Instead, the engine 500 is controlled based on the accelerator position moderating value Accs (see FIG. 6) where the moderating process is performed on the accelerator position Acc. Accordingly, the driving power is output to the driving wheels 505L and 505R while being gradually increased, reducing deterioration of drivability in recovery of the driving power.

In this (Embodiment 3) as well, the moderating coefficient K for the moderating process on the actual accelerator position Acc may be a constant value, or the moderating coefficient K may be set variable corresponding to the actual accelerator position Acc.

To set the moderating coefficient K for the moderating process variable, similarly to the above-described (Embodiment 1 (Modification 1)), in the case where the actual accelerator position Acc when the restart is requested on the hybrid system in the accelerator-on state is large, the moderating coefficient K for the moderating process (the expression (1)) may be set large, compared with a small actual accelerator position Acc. The larger the moderating coefficient K for the moderating process (the expression (1)) may be set, the larger the actual accelerator position Acc is when there has been a request to restart the engine in the accelerator-on state. This setting ensures more effective reduction of deterioration of drivability when the amount of accelerator operation upon hybrid system restart request is large.

In this embodiment as well, the process similar to the above-described (Embodiment 1) may be configured. That is, during running of the vehicle 500, when accelerator position difference (accelerator position when the engine is restarted—accelerator position when the engine is stopped) based on the difference between the accelerator position upon stop of the engine 501 and the accelerator position upon the restart request of the engine is equal to or more than the predetermined determination value, the driving power moderating control at restart may be performed. If the accelerator position difference is smaller than the determination value, the driving power moderating control at restart may not be performed. When the driving power moderating control at restart is not performed, the driving power corresponding to the accelerator position Acc is output to the driving wheels 505L and 505R.

Furthermore, in this embodiment as well, control similar to the above-described (Embodiment 1 (Modification 2)) may be configured. That is, in the case where the stop operation of the engine 501 is performed and then the restart is requested on the engine in the accelerator-on state, and the accelerator operation is repeatedly performed between on and off after the restart request, every time the accelerator-on operation is performed, a degree of increase (increasing rate of the driving power) of the driving power (driving power output to the driving wheels 505L and 505R) may be controlled to be increased. In this case, for example, similarly to the above-described process in FIG. 7, the moderating coefficient K0 employed for calculation of the accelerator position moderating value Accs during restart request of the engine 501 may be set to a maximum value. Thereafter, a process that sequentially decreases the moderating coefficients K1, K2, and K3 may be performed every time the accelerator-on operation is performed. Thus, the degree of increase of the driving power (driving power output to the driving wheels 505L and 505R) may be gradually increased.

Assume, for example, a conventional vehicle where the engine automatically stops and automatically starts. In such conventional vehicle, the moderating coefficient of the embodiment (the moderating coefficient K for the moderating process (the expression (1)) may be different from a moderating coefficient employed for the case where the driving power is gradually increased in automatic start based on depression of the accelerator pedal during automatic stop of the engine at a higher degree than a degree for the case where the engine automatically starts based on the condition other than the depression of the accelerator pedal. That is, in this embodiment, the driving power rises triggered by pressing the power switch (ignition switch) with the accelerator pedal depressed. Accordingly, start timing of rising the driving power somewhat matches the driver's intention. However, to reduce deterioration of drivability due to press of the power switch with the accelerator pedal depressed, the driving power is gradually raised. On the other hand, the following problem arises in the vehicle whose engine is automatically stopped. The timing when the accelerator pedal is depressed or a foot is released off the brake pedal (request of creep torque) should be start timing of rising of the driving power intended by the driver. However, the actual rising is slightly delayed. To solve the problem, controlling the driving power to be gradually raised is considered. Moderating coefficients to handle these different problems may be set to appropriate values corresponding to the respective problems.

Assume a conventional vehicle where the engine automatically stops and automatically starts. In such conventional vehicle, the moderating coefficient of the embodiment may be the same moderating coefficient employed for the case where the driving power is gradually increased in automatic start based on depression of the accelerator pedal during automatic stop of the engine at a higher degree than a degree for the case where the engine automatically starts based on the condition other than the depression of the accelerator pedal. Thus, it is possible to achieve simplification on the control.

—Other Embodiments—

While the above-described (Embodiment 1) shows an example using the power switch 107 of a rebounding push switch as an operating unit, which operates start and stop of the hybrid system, this should not be construed in a limiting sense. Any other configuration is possible insofar as the operating unit can receive an operation. For example, the operating unit may employ a lever switch, a slide switch, a key switch where a key is inserted into a cylinder and rotated, or a similar switch.

While in the above-described (Embodiment 1), the present invention is applied to the FF system hybrid vehicle HV as the example, this should not be construed in a limiting sense. The present invention may be applied to an FR system hybrid vehicle or a 4WD system hybrid vehicle.

While in the above-described (Embodiment 1), the description is made on the example in which the present invention is applied to the so-called split-type hybrid vehicle HV in which the two motor generators MG1 and MG2 and the power split mechanism 3 are mounted, the present invention is not limited to this configuration. The present invention is also applicable to a so-called series system or a parallel system hybrid vehicle. The series system hybrid vehicle is a hybrid vehicle whose engine is employed for only electric generation by a generator and driving wheels are driven only by a motor. The parallel system hybrid vehicle is a hybrid vehicle whose driving wheels are driven by an engine and a motor.

While in the above-described (Embodiment 1), a long pressing of the power switch 107 is described as an exemplary stop operation of the hybrid system for the hybrid vehicle HV during running, this should not be construed in a limiting sense. The stop operation of the hybrid system for the hybrid vehicle HV during running may be short pressing of the power switch 107 or similar pressing. Also, the same stop operation of the hybrid system may be used during stopping and during running of the hybrid vehicle HV.

While in the above-described (Embodiment 1), an example where performing moderating process on the accelerator position Acc gradually increases the driving power output to the driving wheels 6L and 6R is described, this should not be construed in a limiting sense. Moderating process may be performed on a required value of total output (the request driving power Pr), which is an output from the engine 1 and the motor generators MG1 and MG2 to the driving wheels 6L and 6R (the drive shaft 61). The moderating process may be performed on the output required value of the second motor generator MG2. Furthermore, controlling a driving power transmission system such as a clutch and an automatic transmission may gradually increase the driving power output to the driving wheels 6L and 6R. The same goes for (Embodiment 2) and (Embodiment 3).

In the above-described (Embodiment 1), assume that the hybrid system is restarted in the accelerator on-state of a predetermined amount of depression. In that state, compared with the case where the hybrid system is restarted in the accelerator off-state and then the accelerator pedal is rapidly depressed to the same extent as the predetermined amount of depression, the driving power output to the driving wheels 6L and 6R is gradually increased. The same goes for (Embodiment 2) and (Embodiment 3).

In the above-described (Embodiment 1) or (Embodiment 2), an example of applying the present invention to control of the hybrid vehicle with two motor generators or one motor generator is described. However, the present invention is also applicable to control of the hybrid vehicle with equal to or more than three motor generators and at least one of the motor generators assists driving power for running of the vehicle.

Here, the present invention is also applicable to an electric vehicle, a fuel cell vehicle, or a similar vehicle with only an electric motor for driving power source for running, as well as the hybrid vehicle and the conventional vehicle.

INDUSTRIAL APPLICABILITY

The present invention is applicable to control of a vehicle with a driving power source to output driving power for running to driving wheels. More specifically, the present invention is effectively applicable to control of the driving power source in restart during running of the vehicle.

DESCRIPTION OF REFERENCE SIGNS 1 engine (driving power source)
6L, R driving wheel
7 accelerator pedal
100 ECU
104 accelerator position sensor
107 power switch
MG1 first motor generator (driving power source)
MG2 second motor generator (driving power source)

The invention claimed is:

1. A control apparatus for a vehicle with a driving power source to output driving power for running to a driving wheel, wherein
in a case where a restart is requested on the driving power source in an accelerator-on state after a stop operation is performed on the driving power source during running of the vehicle and before the vehicle stops running and an accelerator position difference between an accelerator position upon the restart request of the driving power source and an accelerator position upon the stop operation of the driving power source is equal to or more than a predetermined determination value, the control apparatus performs a driving power moderating control that gradually increases driving power output to the driving wheel, in a case where the accelerator position difference is smaller than the determination value, the control apparatus does not perform the driving power moderating control, and
in a case where the restart is requested on the driving power source in the accelerator-on state after the stop operation is performed on the driving power source during running of the vehicle and an accelerator operation is repeatedly performed between on and off after the restart request, the driving power moderating control increases a degree of gradual increase in the driving power output to the driving wheel every time the accelerator-on operation is performed.

2. The control apparatus for a vehicle according to claim 1, wherein
the control apparatus gradually increases the driving power output to the driving wheel by controlling output driving power from the driving power source based on an accelerator position moderating value, the accelerator position moderating value being a value where a moderating process is performed on an actual accelerator position when the restart is requested on the driving power source in the accelerator-on state after the stop operation is performed on the driving power source during running of the vehicle and before the vehicle stops running.

3. The control apparatus for a vehicle according to claim 2, wherein
in a case where the actual accelerator position when the restart is requested on the driving power source in the accelerator-on state after the stop operation is performed on the driving power source during running of the vehicle and before the vehicle stops running is large, a moderating coefficient for the moderating process is set large compared with a case where the actual accelerator position is small.

4. The control apparatus for a vehicle according to claim 1, wherein
in the case where output driving power from the driving power source is controlled based on an accelerator position moderating value where a moderating process is performed on an actual accelerator position when the restart is requested on the driving power source, a moderating coefficient for the moderating process is decreased every time the accelerator-on operation is performed, so as to increase a degree of gradual increase of the driving power output to the driving wheel.

5. The control apparatus for a vehicle according to claim 1, wherein
the control apparatus includes an engine and an electric motor as the driving power source for running.

6. The control apparatus for a vehicle according to claim 1, wherein
the control apparatus includes only an engine as the driving power source for running.

7. The control apparatus for a vehicle according to claim 1, wherein
the control apparatus includes only an electric motor as the driving power source for running.

8. A control apparatus for a vehicle with a driving power source to output driving power for running to a driving wheel, wherein
when the driving power source is restarted by a start operation of the driving power source in an accelerator-on state after a stop operation is performed on the driving power source during running of the vehicle and before the vehicle stops running, in a case where an accelerator position difference between an accelerator position upon the restart operation of the driving power source and an accelerator position upon the stop operation of the driving power source is equal to or more than a predetermined determination value, the control apparatus performs a driving power moderating control that gradually increase driving power output from the driving power source to the driving wheel, in a case where the accelerator position difference is smaller than the determination value, the control apparatus does not to perform the driving power moderating control, and
in a case where the start operation of the driving power source is performed in the accelerator-on state after the stop operation is performed on the driving power source during running of the vehicle and an accelerator operation is repeatedly performed between on and off after the start operation, the driving power moderating control increases a degree of gradual increase in the driving power output to the driving wheel every time the accelerator-on operation is performed.

* * * * *